(12) United States Patent
Dowling et al.

(10) Patent No.: US 7,142,843 B2
(45) Date of Patent: *Nov. 28, 2006

(54) GEOGRAPHICAL WEB BROWSER, METHODS, APPARATUS AND SYSTEMS

(76) Inventors: Eric Morgan Dowling, 5107 5th Ave., Holmes Beach, FL (US) 34217; Duncan Leo MacFarlane, 6615 Desco Dr., Dallas, TX (US) 75225; Mark Nicholas Anastasi, 405 Copperus Trail, Highland Village, TX (US) 75077

( * ) Notice: Subject to any disclaimer, the term of this patent is extended or adjusted under 35 U.S.C. 154(b) by 0 days.

This patent is subject to a terminal disclaimer.

(21) Appl. No.: 11/099,484

(22) Filed: Apr. 6, 2005

(65) Prior Publication Data

US 2005/0181806 A1    Aug. 18, 2005

Related U.S. Application Data

(63) Continuation of application No. 10/937,286, filed on Sep. 10, 2004, now Pat. No. 6,983,139, which is a continuation of application No. 10/294,075, filed on Nov. 14, 2002, now Pat. No. 6,873,850, which is a continuation of application No. 09/195,171, filed on Nov. 17, 1998, now Pat. No. 6,522,875.

(51) Int. Cl.
*H04M 11/04*    (2006.01)

(52) U.S. Cl. .............................. 455/414.1; 455/414.2; 709/233

(58) Field of Classification Search ............. 455/414.3, 455/422.1, 412.1, 414.2, 414.4, 456.3; 370/310; 707/10; 709/708, 226; 340/905; 705/37, 705/14

See application file for complete search history.

(56) References Cited

U.S. PATENT DOCUMENTS

| 4,325,146 A | 4/1982 | Lennington |
| 5,027,269 A | 6/1991 | Grant et al. |
| 5,081,707 A | 1/1992 | Schorman et al. |
| 5,126,941 A | 6/1992 | Gurmu et al. |
| 5,223,844 A | 6/1993 | Mansell et al. |
| 5,351,052 A | 9/1994 | D'Hont et al. |
| 5,424,727 A | 6/1995 | Shieh |
| 5,506,897 A | 4/1996 | Moore et al. |

(Continued)

FOREIGN PATENT DOCUMENTS

WO    WO 99/07125    2/1999

(Continued)

*Primary Examiner*—Temica Beamer
*Assistant Examiner*—Joy Contee
(74) *Attorney, Agent, or Firm*—Eric M. Dowling

(57) ABSTRACT

A geographical web browser allows a user to navigate a network application such as the Word Wide Web by physically navigating in geographical coordinates and roaming through coverage areas of cellular base stations, wireless LANs, microcells, and other such broadcast domains. A mobile unit communicates with a network server via an air interface that supports wireless packet data. A packet filter filters local hotspot push messages to see whether they coincide with the user's preferences. In some embodiments, the push message is used to notify the user that information is available for download, and in other embodiments the push message provides the content directly to the user.

23 Claims, 5 Drawing Sheets

U.S. PATENT DOCUMENTS

| | | | |
|---|---|---|---|
| 5,513,216 A | 4/1996 | Gadot et al. |
| 5,543,789 A | 8/1996 | Behr et al. |
| 5,550,908 A | 8/1996 | Cai et al. |
| 5,559,520 A | 9/1996 | Barzegar et al. |
| 5,570,417 A | 10/1996 | Byers |
| 5,572,528 A | 11/1996 | Shuen et al. |
| 5,604,769 A | 2/1997 | Wang |
| 5,648,768 A | 7/1997 | Bouve |
| 5,682,525 A | 10/1997 | Bouve et al. |
| 5,684,859 A | 11/1997 | Chanroo et al. |
| 5,689,825 A | 11/1997 | Averbuch et al. |
| 5,710,702 A | 1/1998 | Hayashi et al. |
| 5,712,899 A | 1/1998 | Pace, II |
| 5,715,464 A | 2/1998 | Crump et al. |
| 5,717,392 A | 2/1998 | Eldridge |
| 5,724,412 A | 3/1998 | Srinivasan |
| 5,724,521 A | 3/1998 | Dedrick |
| 5,727,057 A | 3/1998 | Emery et al. |
| 5,732,074 A | 3/1998 | Spaur et al. |
| 5,745,695 A | 4/1998 | Gilchrist et al. |
| 5,751,227 A | 5/1998 | Yoshida et al. |
| 5,754,786 A | 5/1998 | Diaz et al. |
| 5,771,353 A | 6/1998 | Eggleston et al. |
| 5,790,642 A | 8/1998 | Taylor et al. |
| 5,796,728 A | 8/1998 | Rondeau et al. |
| 5,835,061 A | 11/1998 | Stewart |
| 5,839,088 A | 11/1998 | Hancock et al. |
| 5,848,396 A | 12/1998 | Gerace |
| 5,862,339 A | 1/1999 | Bonnaure et al. |
| 5,864,764 A | 1/1999 | Thro et al. |
| 5,864,823 A | 1/1999 | Levitan |
| 5,884,033 A | 3/1999 | Duvall |
| 5,887,254 A | 3/1999 | Halonen |
| 5,905,865 A | 5/1999 | Palmer |
| 5,928,363 A | 7/1999 | Ruvolo |
| 5,930,474 A | 7/1999 | Dunworth et al. |
| 5,938,721 A | 8/1999 | Dussell et al. |
| 5,949,776 A | 9/1999 | Mahany et al. |
| 5,969,678 A | 10/1999 | Stewart |
| 5,982,325 A | 11/1999 | Thornton et al. |
| 5,987,062 A | 11/1999 | Engwer et al. |
| 6,005,926 A | 12/1999 | Mashinsky |
| 6,009,355 A | 12/1999 | Obradovich et al. |
| 6,014,090 A | 1/2000 | Rosen et al. |
| 6,028,537 A | 2/2000 | Suman et al. |
| 6,029,141 A | 2/2000 | Bezos et al. |
| 6,047,236 A | 4/2000 | Hancock et al. |
| 6,049,711 A | 4/2000 | Ben-Yehezkel et al. |
| 6,052,439 A | 4/2000 | Gerszberg et al. |
| 6,052,600 A | 4/2000 | Fette et al. |
| 6,058,422 A | 5/2000 | Ayanoglu et al. |
| 6,061,565 A | 5/2000 | Innes et al. |
| 6,067,008 A | 5/2000 | Smith |
| 6,072,483 A | 6/2000 | Rosin et al. |
| 6,088,594 A | 7/2000 | Kingdon et al. |
| 6,088,600 A | 7/2000 | Rasmussen |
| 6,091,956 A * | 7/2000 | Hollenberg ............... 455/456.5 |
| 6,101,531 A | 8/2000 | Eggleston et al. |
| 6,107,940 A | 8/2000 | Grimm |
| 6,108,533 A | 8/2000 | Brohoff et al. |
| 6,115,754 A | 9/2000 | Landgren |
| 6,122,520 A | 9/2000 | Want et al. |
| 6,148,261 A | 11/2000 | Obradovich et al. |
| 6,154,212 A | 11/2000 | Erick et al. |
| 6,154,461 A | 11/2000 | Sturniolo et al. |
| 6,154,745 A | 11/2000 | Kari et al. |
| 6,157,630 A | 12/2000 | Adler et al. |
| 6,167,255 A | 12/2000 | Kennedy et al. |
| 6,175,589 B1 | 1/2001 | Cummings |
| 6,185,204 B1 | 2/2001 | Volt |
| 6,185,205 B1 | 2/2001 | Sharrit et al. |
| 6,185,541 B1 | 2/2001 | Scroggie |
| 6,199,045 B1 | 3/2001 | Giniger et al. |
| 6,201,962 B1 | 3/2001 | Sturniolo |
| 6,202,023 B1 | 3/2001 | Hancock et al. |
| 6,205,211 B1 | 3/2001 | Thomas et al. |
| 6,230,012 B1 | 5/2001 | Willkie et al. |
| 6,236,652 B1 | 5/2001 | Preston et al. |
| 6,243,572 B1 | 6/2001 | Chow et al. |
| 6,269,402 B1 | 7/2001 | Lin et al. |
| 6,285,858 B1 | 9/2001 | Yoshida |
| 6,289,464 B1 | 9/2001 | Wecker et al. |
| 6,308,281 B1 | 10/2001 | Hall et al. |
| 6,317,718 B1 | 11/2001 | Fano |
| 6,330,454 B1 | 12/2001 | Verdonk |
| 6,332,127 B1 | 12/2001 | Bandera et al. |
| 6,334,131 B1 | 12/2001 | Chakrabarti et al. |
| 6,353,398 B1 | 3/2002 | Amin et al. |
| 6,353,743 B1 | 3/2002 | Karmel |
| 6,366,298 B1 | 4/2002 | Haitsuka |
| 6,400,941 B1 | 6/2002 | Nara |
| 6,408,307 B1 | 6/2002 | Semple et al. |
| 6,415,291 B1 | 7/2002 | Bouve et al. |
| 6,421,707 B1 | 7/2002 | Miller et al. |
| 6,442,598 B1 | 8/2002 | Wight et al. |
| 6,456,603 B1 | 9/2002 | Ismailov et al. |
| 6,470,179 B1 | 10/2002 | Chow et al. |
| 6,496,572 B1 | 12/2002 | Liang et al. |
| 6,535,493 B1 | 3/2003 | Lee et al. |
| 6,542,489 B1 | 4/2003 | Kari |
| 6,546,261 B1 | 4/2003 | Cummings |
| 6,546,425 B1 | 4/2003 | Hanson et al. |
| 6,560,239 B1 | 5/2003 | Frid et al. |
| 6,560,456 B1 | 5/2003 | Lohtia |
| 6,571,290 B1 | 5/2003 | Selgas |
| 6,574,239 B1 | 6/2003 | Dowling et al. |
| 6,584,321 B1 | 6/2003 | Coan et al. |
| 6,594,488 B1 | 7/2003 | Chow et al. |
| 6,594,692 B1 | 7/2003 | Reisman et al. |
| 6,600,734 B1 | 7/2003 | Gernert et al. |
| 6,643,684 B1 | 11/2003 | Malkin et al. |
| 6,647,425 B1 | 11/2003 | Chaddha |
| 6,654,359 B1 | 11/2003 | La Porta et al. |
| 6,654,615 B1 | 11/2003 | Chow et al. |
| 6,704,773 B1 | 3/2004 | Cohn et al. |
| 6,714,536 B1 | 3/2004 | Dowling |
| 6,724,833 B1 | 4/2004 | Cummings |
| 6,778,832 B1 | 8/2004 | Chow et al. |
| 6,826,405 B1 | 11/2004 | Dovaik et al. |
| 6,873,850 B1 | 3/2005 | Dowling et al. |
| 6,904,359 B1 * | 6/2005 | Jones ........................ 701/204 |
| 2002/0029186 A1 | 3/2002 | Roth et al. |
| 2002/0044067 A1 | 4/2002 | Ilcisin |
| 2002/0188584 A1 | 12/2002 | Ghannam et al. |
| 2004/0062213 A1 | 4/2004 | Kross |

FOREIGN PATENT DOCUMENTS

| | | |
|---|---|---|
| WO | WO 99/13644 | 3/1999 |

* cited by examiner

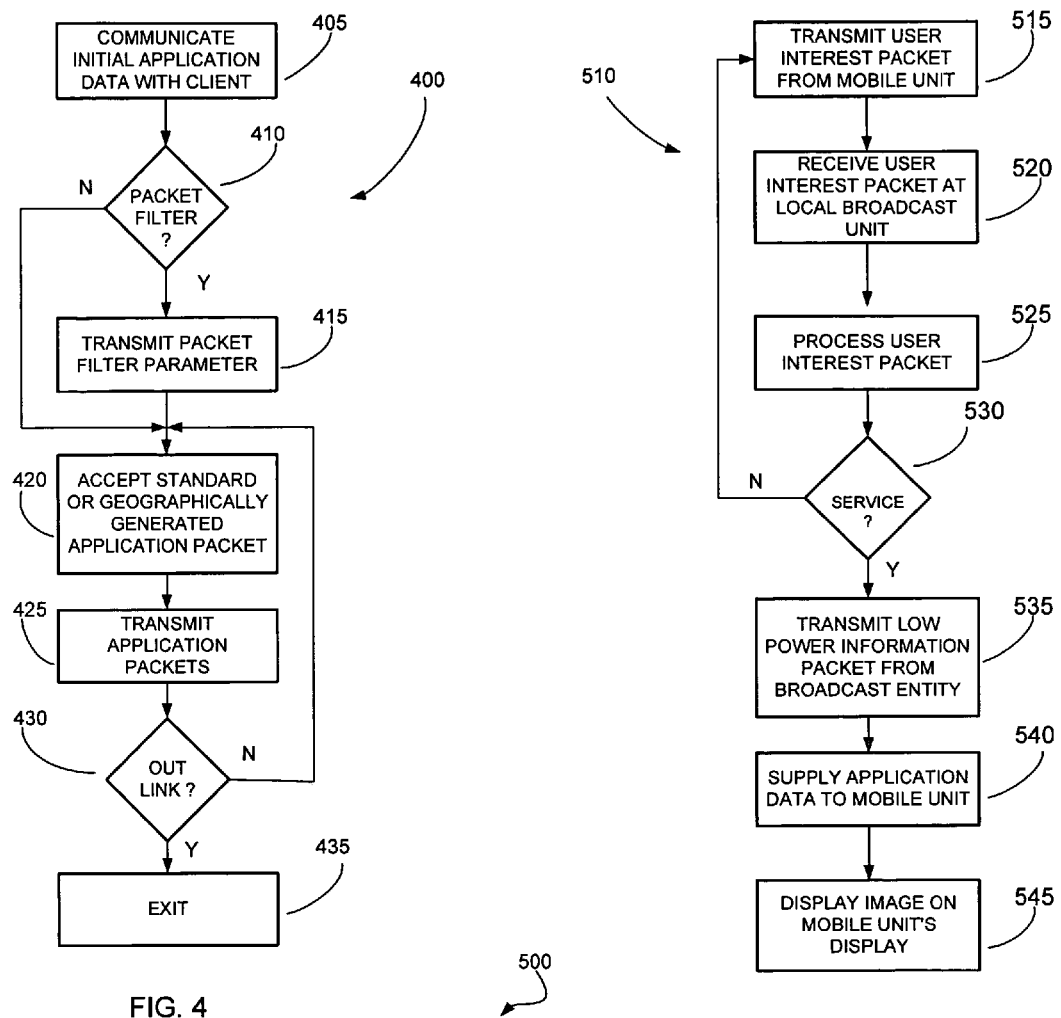

GEOGRAPHICAL WEB BROWSER, METHODS, APPARATUS AND SYSTEMS

The present application is a continuation of U.S. patent application Ser. No. 10/937,286, filed Sep. 10, 2004, now U.S. Pat. No. 6,983,139, which is a continuation of U.S. patent application Ser. No. 10/294,075, filed Nov. 14, 2002, now U.S. Pat. No. 6,873,850, which is a continuation of U.S. patent application Ser. No. 09/195,171, filed on Nov. 17, 1998 entitled "Geographical Web Browser, Methods, Apparatus, and Systems," now U.S. Pat. No. 6,522,875. Additionally, this application is related to U.S. patent application Ser. No. 09/167,698 filed Oct. 7, 1998, entitled "Virtual Connection of a Remote Unit to a Server," now U.S. Pat. No. 6,574,239.

BACKGROUND OF THE INVENTION

1. Field of the Invention

This invention relates generally to mobile data networks. More particularly, the invention relates to a network application program such as a web browser which allows a user to navigate a set of network web pages based on a user's location and the setting of one or more auxiliary control parameters.

2. Description of the Related Art

The concept of providing a local broadcast domain through which a mobile unit passes is well known. For example, when on a cross-country trip, an automobile passes through various areas of FM radio coverage. In the art of cellular communications it has become common practice to reduce the size of a given broadcast domain. This allows frequencies to be efficiently reused. In spread spectrum communications, it is also recognized that multiple users may share frequency within a small-area broadcast domain using differently encoded waveforms for different users. Companies such as Nokia Inc. have proposed systems whereby information is broadcast to mobile subscribers within a telecommunications cell. In some envisioned methods, this broadcast information is accessible from a network application such as a web browser. A mobile subscriber is able to click on an icon and view, for example, restaurants located in the vicinity of the telecommunications cell occupied by the mobile subscriber.

Recently systems have been introduced whereby a mobile unit such as an automobile passes through a series of very small broadcast domains. Each broadcast domain is called a "picocell". For example, as a mobile user in an automobile travels along a road, the automobile encounters a sequence of network air-interface transceivers that are mounted on telephone poles and periodically placed along the roadside. The vehicle can maintain a network connection by accessing the nearest air interface at any given time. Similar picocell based systems allow a user walking through a building or campus environment to stay connected to a wireless local area network (LAN). The term "air interface" is used in the art to mean a set of physical layer protocols used to communicate information via radio and other forms of wireless connections.

Data networks are also available whereby a mobile unit maintains a wireless network connection with a central server. For example, cellular digital packet data (CDPD), Internet packet Data Network (IPDN) and related technologies exist to allow a mobile unit to interact with an application such as a database. In other systems, radio frequency (RF) modems allow a mobile unit to maintain a network connection to stay connected to the Internet or some other type of network. For example, Global System Mobile (GSM) and Personal Communication Systems (PCS) technologies also allow wireless data connections to be established. Pico-cell based systems also provide wireless networks for similar use within buildings and campus environments.

A co-pending application, Ser. No. 09/167,698 by Eric M. Dowling and Mark N. Anastasi is incorporated herein by reference and is referred to as the "Dowling reference" hereinafter. In the Dowling reference, a method is disclosed to allow a mobile unit to maintain a virtual session with a central server. In a virtual session, an application layer program maintains a communication session in the absence of a physical communication path. When the session is inactive, no communication path exists. When data needs to be communicated, a physical connection is automatically established. This allows a remote unit to maintain a presence with a central server using, for example, a cellular connection. The virtual session only establishes the cellular connection when it is actually being used for network communications. In the context of the present disclosure, the "remote unit" as defined in the Dowling reference is termed a "mobile unit." In a virtual-session based system, the mobile unit uses a cellular connection to maintain a virtual session with a network server attached to a network. The mobile unit runs an application program such as a web browser to communicate with a web site, an Internet site, an intranet site or other application program provided by the network server. Only when the user is actively selecting a link or downloading information is a physical communication path established to support the virtual session.

Another known technology is the global positioning system (GPS). GPS receivers use telemetry information broadcast form satellites to calculate a set of grid coordinates to provide positional information. A mobile unit equipped with a GPS receiver can thereby maintain a fix on its geographical position.

Systems have been introduced by several automobile manufacturers that use a GPS receiver to control the display of digital map information in automobiles. The map data includes locations of various types of business establishments. The map and business establishment data for these systems is stored in a PROM or EPROM memory. Typically these storage devices contain data pertinent to one state. In order to update this data the owner of the vehicle must return to the dealer once a year to have change the PROM or reprogram the EPROM. A traveler wishing to travel between states must purchase additional memory modules programmed with data for the states to be traveled in advance of an out-of-state trip. While the aforementioned technologies provide valuable services and capabilities, these systems are lacking in various ways. For example, consumer radio broadcast technology still uses large broadcast domains such as AM and FM radio stations. While next generation systems have been proposed that will effectively broadcast information such as local advertisements and service announcements to vehicles or pedestrians passing through a telecommunications cell, small locality, no technology exists to provide local broadcast information to automatically control a network application such as a web browser by selectively filtering broadcast information using a packet filter. Current approaches require a user to select an icon or navigate a browser application via conventional means to access information specific to a local area. Also, systems do not exist which allow information processed by a GPS receiver to control the flow of information on a network connection with a server. For example, no web browsers exist which process GPS transmissions to determine geographical position, and use this geographical position information to control what web pages are displayed by the browser. Likewise, no systems exist which accept locally broadcast transmissions such as from a local telephone pole and use this information to control information displayed by the web browser.

It would be desirable to have a system that could provide a user with a means to receive information from a first connection to a network based on the user's position. It would be desirable to allow an application such as a web browser to control a flow of information comprising web pages based on a locally received broadcast. It also would be desirable to allow an application such as a web browser to control the flow of web pages based on processed GPS data. It would be desirable to have a mobile unit that could receive one or more transmissions via a second connection and then generate a request packet on a first connection to navigate an application program such as a web browser. It also would be desirable to have a network server that is operative to receive request packets that are generated based on information received from these transmissions.

Systems currently envisioned by telecommunication firms rely on the knowledge of the user's operating wireless cell. As a position or location measurement system, this knowledge is coarse. Further, as a means for regulating pertinent information, reliance solely on cell data is limiting. Cell coordinates are too coarse to allow data such as direction of travel, speed of travel, etc to be used to predict items of interest to the user. It would therefore be desirable to base broadcast content on detailed user information including, but not limited to, past and present GPS location data.

For certain applications it would be desirable to be able to effectively use a relatively small broadcast domain to produce an "electronic sign." As defined herein, an "electronic sign" involves a system whereby a transmitter broadcasts one or more data packets to be received by a mobile unit as carried by a vehicle or a pedestrian. For example, instead of a passenger looking out of a window to see a billboard, the passenger looks at a computer display screen associated with a dashboard computer device within the vehicle. Alternatively it would also be desirable to make use of the relatively small broadcast domain to produce an "indirect electronic sign." As is also defined herein, an "indirect electronic sign" involves a system whereby a transmitter broadcasts at least one data packet to the mobile unit that then extracts information from the packet and uses it to access an associated web page. In such a system, it would be desirable to download the web pages from the server using the first network connection which is preferably a CDPD connection or a virtual session connection. Moreover, it would be desirable for the mobile unit to be able to supply a filter parameter to allow locally received broadcast packets to be selectively rejected (e.g. based on content or subject matter) and thereby not alter the web page displayed by the mobile unit.

Currently in cities and on major highways there are deployed updateable billboard sized displays that are used to inform drivers of upcoming traffic and road conditions. This information may potentially add convenience to the drivers and allow the roadway to be better utilized more efficiently. For example, a large, updateable billboard sized display can inform drivers of an accident on the roadway ahead. This information is used to prompt lane selection or alternate route selection. However, the information contained on these displays is limited in amount, and allows no dialogue or multilevel queries. It would therefore be desirable to have a display system capable of displaying detailed information in a structured manner to allow for navigation, route planning and advanced traffic management.

In other applications it would be desirable to update a large memory device within the mobile unit with current information directly from the network without the need to change memory modules or reprogram memory modules. These on-board memory devices could then be accessed for information without the necessity to access an internet connection. It would thus be desirable to be able to update this stored information by downloading information from the Internet or some other convenient and accessible network.

Patent application Ser. No. 09,195,171, filed on Nov. 17, 1998 entitled "Geographical Web Browser, Methods, Apparatus, and Systems," to include the originally filed claim set, is incorporated herein by reference.

SUMMARY OF THE INVENTION

The present invention solves these and other problems by providing systems and methods to enable a mobile unit to maintain a first network connection with a central server and to control information flow on this connection using information received on an auxiliary channel. In one example, a mobile unit travels along a road and is exposed to a plurality of locally broadcast packets as the mobile unit enters into a local broadcast domain. A local broadcast domain includes the range of a transmitter that broadcasts data packets to mobile units within this range. When a packet of interest is received, information is automatically transferred via the first network connection and a web page or related application information is thereby accessed. Instead of the user needing to click upon a hyperlink to access a web site, a packet filter is configured to selectively pass packets according to a predefined criterion. When a packet passes through the packet filter, a web site is automatically accessed.

Because the received packet is transmitted from within a local broadcast domain, this packet carries with it geographically related information. For example, if a geographical web browser according to the present invention is currently set to a "movies" Internet site, when the mobile unit passes into an area with several movie theaters, the passed packet will include a pointer to the associated movie theaters'web pages. In some systems the web pages will be automatically downloaded into a buffer within the mobile unit, while in other systems a set of hyperlinks to these local theaters will appear.

In another aspect of the present invention, the mobile unit also maintains the network connection, but derives geographical information from a GPS receiver. The network connection preferably is an Internet connection or a connection to a central server such as a database server. GPS information is received and processed in the GPS receiver. Periodically, processed GPS information may be transmitted via the mobile network connection to the network server. When this processed GPS information is received, the network server is operative to control the flow of information to the mobile unit based upon the processed GPS information. In some embodiments the mobile unit maintains a list of local sites and sends information to the server based on a configuration parameter. This information may be specific to the requested areas of interest or it may contain a complete update to the mobile unit's database.

The mobile unit is thereby able to navigate the Internet based on the mobile unit's geographical position in addition to prior art methods employing mouse and keyboard inputs.

When a virtual connection is being used, GPS information need only be transmitted at pre-specified intervals or upon the detection of pre-specified events. For example, a filter is preferably employed to cause the network connection to only be activated when the mobile unit enters a locality associated with a web site of interest. For example, a hungry user entering a new city is interested in seeing web pages for local restaurants. Based upon the GPS position indication a list of restaurants in surrounding localities is downloaded into a memory of the mobile unit. When the GPS receiver indicates the mobile unit is in a designated locality, web pages for those restaurants in the local area are downloaded or retrieved from memory and displayed.

The present invention provides a means for a user to "surf the web" or otherwise navigate a network application program based on geographically related information such as locally broadcast packets and GPS information. One or more filter parameters are used to screen information of interest to a user. A set of information deemed to be of interest to a user is called an "information class."

The present invention also enables a road-navigation or traffic management system. For example, the user maintains a virtual connection to a central server that provides real-time best-route information through a navigation or traffic management web page. A plurality of sensors measures road conditions based on vehicle speeds as measured by sensors such as laser or infrared continuity sensors dispersed along the roadways. Additionally, special traffic data is monitored, or manually entered, including weather advisories, accident locations and effects and special event locations and effects. The central server thereby keeps track of road conditions and is able to display such information and to assign "costs" to route segments. The mobile unit stays virtually connected to the navigation web page and is updated with digital maps indicating the best current route leading from the mobile unit's current position to a selected destination.

BRIEF DESCRIPTION OF THE FIGURES

The various novel features of the present invention are illustrated in the figures listed below and described in the detailed description that follows.

FIG. 4 is a flow chart illustrating a method of processing carried out by a network server to provide a geographically controlled server-side application program.

FIG. 5a is a flow chart illustrating a method of processing carried out by a system comprising a mobile unit, a local broadcast domain entity and optionally a network server to support a geographically controlled client-side application program in the mobile unit.

FIG. 5b is a flow chart illustrating a method of processing carried out by a system comprising a mobile unit, a local broadcast domain entity and optionally a network server to provide customized information to the mobile unit.

DETAILED DESCRIPTION OF THE PREFERRED EMBODIMENTS

Figure 1:
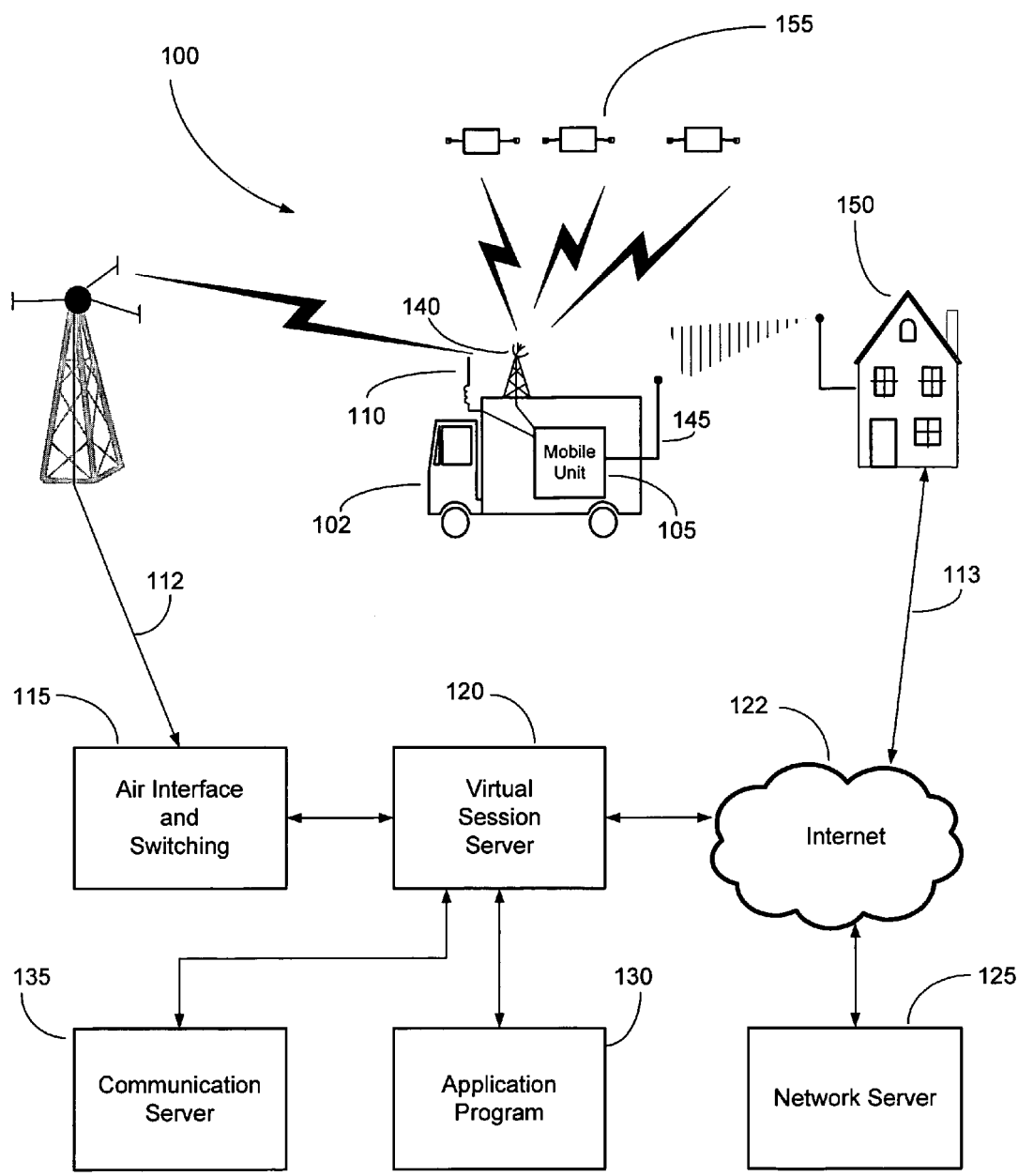
FIG. 1 is a block diagram representing an embodiment of a system involving a mobile unit passing through a locality and maintaining a network connection.

FIG. 1 is a block diagram representing an illustrative embodiment 100 of a system configuration used to support the present invention. A vehicle 102 includes a mobile unit 105. The mobile unit 105 may be designed similarly to the remote unit in the Dowling reference. The architecture of the mobile unit 105 is also discussed in more detail in connection with FIG. 2.

The mobile unit 105 is connected to a first antenna 110 which is used to maintain a first network connection 112. The first network connection 112 is preferably a wireless network connection and may be implemented in several ways. For example the wireless network connection may employ an air interface and protocol stack to interface with an IPDN, a CDPD network, a wideband CDMA data network, or a virtual session oriented network. The antenna 110 is operatively coupled to an air interface and switching module 115. In many applications, the air interface and switching module 115 is provided by a telephone company which provides mobile communication services. In the illustrative embodiment 100, the air interface and switching module 115 is coupled via a communications interface to a virtual session server 120. The virtual session server 120 is discussed in more detail in the Dowling reference. In other embodiments, the virtual session server 120 may be replaced with any available network technology used to provide a network connection to a mobile unit via an air interface. The virtual session server 120 is preferably coupled to a network such as the Internet 122. A network server 125 is coupled to the virtual session server 120. The network server 125 may be co-located with and directly coupled to the virtual session server 120 as an application program 130, or may be coupled across a network such as the Internet 122 as shown in the illustrative embodiment 100. That is, in any of the embodiments as discussed herein, the network server 125 may be optionally implemented as the application program 130.

A communication server 135 may also be coupled to the virtual session server 120 to provide the mobile unit 105 with a virtual communication presence at the virtual session server 120. This allows calls and other communications received at the virtual session server 120 to be forwarded to the mobile unit 105. The communication server 135 is most applicable in systems where the mobile unit 105 and the virtual session server 120 are entities within an enterprise, and the mobile unit 105 needs to maintain a virtual presence with the enterprise computing and communications resources. Details of this type of operation are described in the Dowling reference. The communications server 135 is optional and may be omitted in some embodiments of the invention.

The mobile unit 105 is also optionally coupled to a satellite antenna 140. This antenna, though depicted as a dish antenna, may be implemented with other types of antennas. The satellite antenna 140 may be used to receive satellite communications information. The satellite antenna 140 may also be used to receive GPS transmissions. In some systems, the satellite antenna 140 may be used to both receive and transmit satellite communications data and receive GPS transmissions.

The mobile unit 105 is also optionally coupled to a local broadcast domain antenna 145. The local broadcast domain antenna is coupled to receive locally broadcast transmissions from a local broadcast domain entity 150. The transmission from the local broadcast domain entity 150 may emanate from a building, telephone pole, street light, store front, and the like. In terms of cellular communications technology, the local broadcast domain entity 150 is similar to a picocell level communication system. The local broadcast domain entity 150 may be optionally connected to a network such as the Internet 122 via a second connection 113. In a preferred embodiment, the broadcast domain of the broadcast domain entity 150 is defined by the range of a low-power radio frequency channel. Depending on the system configuration, the range may vary from as low as 50 feet to as high as a few miles. In some embodiments, the low power radio channel is defined by a spread spectrum air interface such as the one used by cordless phones or PCS systems.

The illustrative embodiment 100 shows a mobile unit 105 with a full set of communication channels. In other embodiments, only a subset of these communication channels need be implemented. For example, in a simplest embodiment, only the local broadcast domain antenna 145 is implemented. This simple embodiment may be used to implement methods of processing as discussed in connection with FIGS. 3, 5*a*, and 5*b*. Some aspects of the present invention require the mobile unit 105 to include the network connection antenna 110 and at least one of the local broadcast domain antenna 145 or the satellite antenna 140. In general, an "air-interface antenna" generically applies to any antenna used to maintain a network connection, receive satellite data, transmit local broadcast domain data, receive local broadcast domain data, or perform other related air-interface functions.

The illustrative embodiment 100 may also be altered in other ways. For example, while three distinctly protruding antennas 110, 140, 145 are illustrated, these antennas may be combined into one and may be built into the body of the vehicle so that no actual antennas will be visible as shown. Also, while the illustrative embodiment shows the mobile unit 105 connected into a vehicle, the mobile unit 105 may equally be implemented as a hand-held unit or in some other form convenient to the particular use desired. The present invention may be implemented as a dash-mounted vehicle computer or a hand-held unit such as a palm-pilot, a personal digital assistant or a laptop computer. Also, in some systems the antenna 110 may be used to implement both the network connection 112 as well as the connection to the local broadcast domain entity 150. In some systems the local broadcast domain entity 150 may be implemented as a part of the same cell site as used to provide the network connection 112. In this type of embodiment, the cell site provides mobile telecommunication services, network services, and local broadcast services within the same cell. Layered systems whereby a cell site provides mobile telecommunication services to a cell coverage and the local broadcast domain entity provides broadcast services within a picocell are also contemplated by the system 100. FIG. 1 thus serves as a general background scenario to understand the context of the present invention. The operation of the illustrative embodiment 100 is discussed in more detail in connection with FIGS. 2–6.

Figure 2:
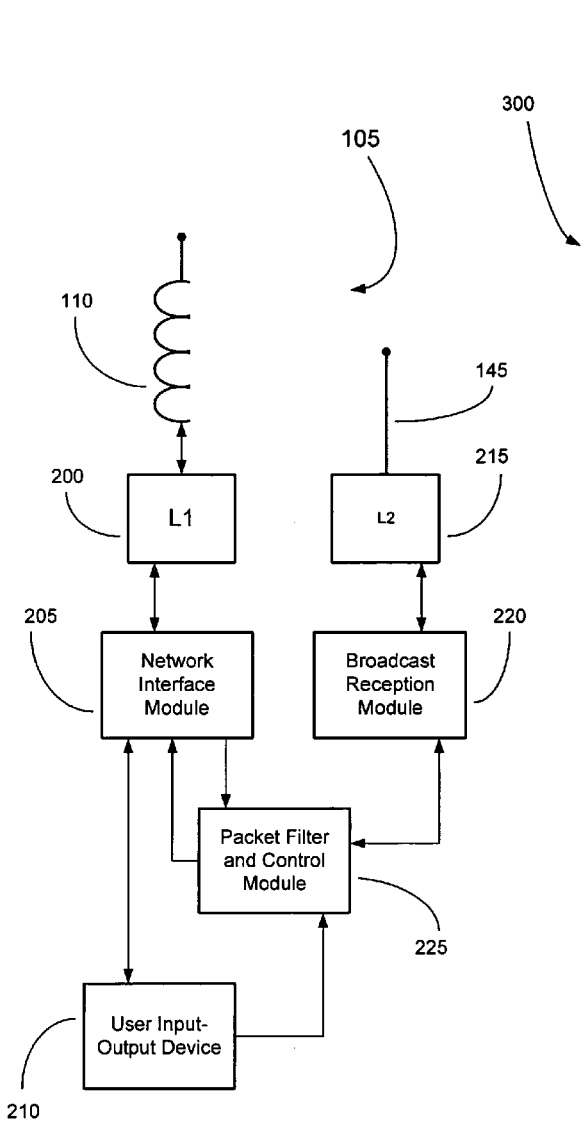
FIG. 2 is a block diagram illustrating the architecture of a mobile unit designed in accordance with the present invention.

Referring now to FIG. 2, an embodiment of the mobile unit 105 is shown. This embodiment includes the mobile network connection antenna 110 and the local broadcast domain antenna 145. A variation of the mobile unit 105 will be discussed herein below whereby the local broadcast domain antenna 145 is replaced with the satellite antenna 140. Still another variation of the mobile unit 105 will be discussed which only employs the local broadcast domain antenna 145. Yet another variation involves a system where the antenna 110 is used for both the network connection 112 and to communicate with the local broadcast domain entity 150. In such systems the local broadcast domain entity may be embodied by the same equipment used to provide the network connection 112.

As illustrated in FIG. 2, the mobile unit 105 includes the network connection antenna 110 which is coupled to a first link interface controller 200. The first link interface controller 200 is preferably implemented as a cellular or PCS transceiver capable of transferring data traffic. The first link interface controller 200 provides a physical layer air interface to support the first network connection 112.

The first link interface controller 200 is coupled to a network interface module 205 which preferably implements one or more software layers within a protocol stack and is able to receive and transmit packet data. Protocol stacks are well known in the art, as is the construction of network interface equipment to implement a network connection. The network interface module 205 preferably includes a virtual session layer software module. The virtual session layer software module directs a physical layer network connection to be established only when it is needed as discussed in the Dowling reference to reduce airtime costs. Other technologies and protocol stacks as implemented in CDPD, GSM, PCS and wideband CDMA data networking systems may alternatively be employed within the first link interface controller 200 and the network interface module 205. Some of these technologies may be augmented with a virtual session server to establish and maintain virtual sessions to achieve the same effect as a constant connection but at a greatly reduced cost due to saving on otherwise wasted airtime.

The network interface module 205 is coupled to a user input-output device 210. The user input-output device is commonly implemented as a display with a mouse and/or keyboard input. Some embodiments make use of other forms of input and/or output such as human speech. When human speech is used as an input, it is received via a microphone, digitized, and processed by a speech recognition circuit to produce a coded command signal representative of a user command.

The local broadcast domain antenna 145 is coupled to a second link interface controller 215. The second link controller 215 provides an air interface to receive and possibly transmit data packets or other signals within a local broadcast domain. The second link interface controller 215 preferably includes radio frequency circuits used to receive a locally broadcast data packet. Some embodiments may receive locally broadcast data packets by means other than radio frequency. For example data may be locally broadcast using microwave or laser signals. In some embodiments, the second link controller 215 provides a physical layer radio connection to receive the locally broadcast data packet. One preferred embodiment implements the second link controller 215 as a spread spectrum transceiver in the 900 MHz range of frequencies. In an alternative embodiment, the second link controller 215 is coupled to the antenna 110 and the second antenna 145 is not used. In this embodiment, the local broadcast domain entity 150 may be co-located with the telecommunication cell's network equipment.

The second link controller 215 is coupled to a broadcast reception module 220. The broadcast reception module preferably receives a baseband data signal from the second link controller 215 and performs framing operations to extract the broadcast information packet therefrom. The process of extracting a packet from a received bit stream is called formatting the data. In some applications the broadcast reception module also includes a transmit data path and the second link controller 215 is able to transmit data packets. In these embodiments, the broadcast reception module 220 is more properly termed a "broadcast transceiver module."

The broadcast reception module 220 is coupled to provide the received and reconstructed data packet to the input of a packet filter 225. The packet filter 225 is preferably coupled to receive a packet-filter parameter from the network interface module 205 and/or the user input-output device 210. Coupling to the network interface module 205 allows the use of web pages to set the parameters for certain types of filters with minimal user intervention. The output of the packet filter 225 is coupled to provide an input to the network interface module 205. In embodiments involving a GPS receiver, the packet filter 225 operates as a control module and performs comparisons of GPS coordinate information with pre-specified boundary information.

A physical processing circuit as used to implement the mobile unit 105 may be implemented in a variety of ways. The preferred way to implement the mobile unit 105 is using a bus-oriented processor architecture whereby a central processing unit is coupled to a memory via a bus. Likewise, the bus couples the central processing unit to peripheral devices such as the user input-output device 210 and the first and second link controllers 200 and 215. The modules 205, 220, and 225 are thereby implemented in software and are controlled by a control program (not shown). Using this standard computer architectural approach, a timer may be used to generate interrupts at timed intervals in order to control the sampling of inputs and the processing performed by the central processor unit. The mobile unit 105 may also be implemented, for example, using custom or semi-custom logic blocks configured within an application specific circuit.

The mobile unit 105 is operative to maintain the first network connection 112 via the network connection antenna 110. Preferably, the first network connection 112 comprises a virtual session or another type of intermittently used data network protocol such as the protocol employed by a CDPD network. The mobile unit 105 preferably moves about in a geographic region, for example carried by the vehicle 102 moving about in a city. As the mobile unit 105 enters the vicinity of the local broadcast domain entity 150, a radio frequency signal is coupled onto the local broadcast domain antenna 145. The local broadcast domain entity 150 is operative to transmit a broadcast-data packet. The second link controller 215 is operative to extract an information signal from the local broadcast domain antenna 145, and to supply the information signal to the broadcast reception module 220. The information signal is preferably supplied as a baseband bit stream to the broadcast reception module 220. The broadcast reception module 220 is operative to extract framing-related data bits from the information signal. The framing bits and possibly other bits such as network layer packet bits are then used to also extract the broadcast-data packet.

The broadcast-data packet is next routed from the broadcast reception module 220 into the input of the packet filter 225. The packet filter 225 is operative to selectively pass the broadcast-data packet if it meets a criterion encoded into one or more packet-filter parameters. The packet-filter parameters may be derived from information supplied from either the network interface module 205 and/or the user input-output module 210. The packet filter parameter typically includes one or more packet-header bit masks. If the header of the broadcast-data packet matches the bit mask, the packet is passed through the packet filter. If the header of the broadcast-data packet does not match the bit mask of the packet-filter parameter, the packet is rejected and no output packet is produced at the packet filter output. In this way, the packet filter selectively passes the broadcast packet, passing it if it matches the mask and rejecting it otherwise. The set of information deemed to be of interest to the user that will pass through the packet filter is called an "information class." Alternatively, the broadcast-data packet may contain keywords. The keywords are compared to a list of keywords provided from either the network interface module 205 and/or the user input-output device 210. If the keyword in the keyword list of the broadcast-data packet matches a keyword list, the packet is passed through the packet filter. If no match is found, the packet is rejected.

A packet filter parameter is similar to a network address in that a particular network entity will receive a packet if information contained therein (such as a network address) matches a criterion and reject it otherwise. However, a packet filter differs from a network address in that a packet may be filtered based on other criteria as well. For example a packet filter may be constructed to reject packets sent from a particular network address, or to pass packets only marked to contain specific types of information. Hence packet filters allow information to be selectively received based upon other criteria beside network addresses.

The output of the packet filter is coupled to the network interface module 205. The output of the packet filter includes any broadcast-data packet that passes through the packet filter. The packet filter output is then used to control information flow on the first network connection 112. For example, the vehicle 102 has recently entered a new city at lunchtime and the user input-output module is manipulated by a user to navigate to a web page for restaurants. This may be done using standard techniques by entering a network address such as a URL, by entering keywords into a search engine or by clicking upon a bookmark in a web browser display. When the user connects to the web page for restaurants, a packet filter mask is downloaded from the web page for restaurants and loaded into the packet filter. Next the network connection is placed in an inactive state whereby the restaurant page is displayed with no physical network connection being needed. The restaurant web page is displayed until the vehicle enters the range of the local broadcast domain entity 150 which broadcasts possibly a complete packet stream comprising a plurality of different types of broadcast-data packets. Only the broadcast-data packets relating to restaurants are allowed to pass through the packet filter 225. These data packets are then passed to the network interface module 205 which sends one or more application request packets to the network server 125. The network server 125 then preferably downloads a set of web pages containing the menus and other information related to the restaurants associated with the received broadcast-data packets. This downloading occurs over the network connection antenna 110.

Note the above system allows a user to log into a web page using known methods. Subsequently the system is operative to navigate to selected web sites, such as those associated with local restaurants, based on the physical location of the mobile unit 105. As the mobile unit 105 enters a new local broadcast domain, a new set of associated web pages will be downloaded. Hence the user need not click on links to find an Internet site but rather drive about geographically to navigate the Internet.

When multiple web pages are downloaded, the browser is preferably configured with a "next" button that advances a displayed image to the next downloaded web page. The "next" button is different from the "forward" button on a conventional web browser. When the "forward" button is selected, the conventional browser goes to a previously viewed web page from which the "back" button was clicked. In the present invention, the "next" button navigates to the next entry in a list of pages that were downloaded because they met the packet-filter criterion but were not yet viewed. Alternatively, the browser could be configured to present a "pick list" menu from which the user can select a hyperlink to an associated set of information.

The foregoing discussion represents a preferred mode of operation, but other preferred modes are also contemplated. For example, in an enterprise environment, a plurality of mobile units carried by vehicles is used by a service providing fleet based within a geographical area. An on-going problem relates to finding the location of the next customer. For example, before setting out for a destination, a user enters information via the input-output device 210 to establish a virtual session with a navigation web page. The user also enters information relating to a desired destination into the navigation web page. Alternatively, the user may enter information to access a scheduling web page from which a worklist generated by a scheduling system is presented, in which case location information may be downloaded via the network interface module 205. The navigation web page then downloads a packet-filter parameter. The packet filter parameter includes a packet-header bit mask that is used to configure the packet filter 225 to selectively pass navigation data. When the navigation system is enabled, the current location of the vehicle is logged and a map is displayed on the user input-output device 210. The displayed map preferably indicates a currently best available route to the destination. The best route is preferably determined by calculating a distance which takes into account current traffic loads, number of traffic lights, average speed along a road and the like. When the user enters the range of a new local broadcast domain entity 150, a navigation packet is received and is selectively passed through the packet filter and a new location is logged. More details regarding how the present invention may be used in navigation applications is discussed in connection with FIG. 6.

In another preferred mode of operation, the mobile unit 105 is modified to include the satellite antenna 140 in lieu of the local broadcast domain antenna 145. In this embodiment, the second link controller 215 and the broadcast reception device 220 are a part of a GPS receiver system. The GPS receiver system provides a set of geographical positional information to the packet filter 225. The packet filter 225 now operates as a control module 225. The control module 225 is operative to perform a comparison of the mobile unit's geographical position to a control parameter, and when the comparison provides an affirmative result, the control module is operative to request a signal comprising image information such as web pages to be transmitted. The control parameter preferably includes an interest designator indicative of an information class. The interest designator, like the packet mask indicates the user's current interest, such as restaurants. For example, when the user enters a new locality as defined by a grid granularity, information related to the mobile unit 105's location is uploaded via the first network connection 112 and the network server 125 downloads the set of restaurant web pages registered for the current locality. Preferably, the control module 225 is loaded with a list of web site designators within the scope of the interest designator. With each web site designator is a geographical coordinates mask. When the mobile unit's GPS coordinates are within the range of the web site's domain, either a stored web page is displayed or the virtual session is activated and the associated web pages are downloaded.

To implement this functionality, a memory module operative to hold a list is provided within the control module 225. This memory module may include a storage unit such as a large memory or a disk in some embodiments. The list includes one or more entries. Each entry preferably includes a first field indicative of a set of application data available on the network server 125 and a second field indicative of a set of boundaries. When the mobile unit's GPS coordinates are within the set of boundaries, a geographical packet is sent to the network server 125. Hence the same result as the previous embodiment is achieved in a different way.

In yet another embodiment of the current invention, the mobile unit's GPS coordinates are used to designate a geographical area of interest. Boundaries of the are set based upon a selected algorithm, such as a radius about the mobile unit's current location or political boundaries such as a state, county or city. All data for the designated area, including map data and business establishment or tourist attraction data, for example, would be downloaded without filtering to a memory device. As inquiries are made by the user or the system using previously described methods, data from this stored database would be filtered by the packet filter 225 based upon the inquiry parameters without the need to re-establish a connection to the internet pages.

An embodiment preferred for low cost systems does not involve the first network connection 112, so it does not include the network connection antenna 110 nor the first link controller 200. In this system, the local broadcast domain entity 150 broadcasts a packet stream containing application data as opposed to pointers to application data. For example, the local broadcast domain entity 150 transmits an HTTP (Hypertext Transfer Protocol) packet stream that includes the web pages themselves. As in the foregoing systems involving locally broadcast packets, the packet filter is configured to selectively pass received packets according to a filter criterion as determined by a packet header bit mask. When the packet filter 225 selectively passes the received packet stream, only the desired web pages are loaded into the browser and optionally displayed. The network connection 112 is not needed and no airtime costs are incurred. Like the previous embodiments, if the packet filter 225 passes packets relating to more than one web page, the web pages are loaded into a buffer that the user preferably navigates using the aforementioned "next" button or pick list.

Note the foregoing low cost system implements a form of a selective "electronic sign." The user selects an area of interest and information related to this area of interest is allowed to be displayed on the user input-output device 210. In some systems of this nature, the second link controller 215 may also be used to transmit an application-request packet such as an HTTP packet transmitted in response to a user clicking a mouse upon a hyperlink. In such systems, the mobile user transmits a request packet indicating its interest to the local broadcast domain entity 150. The local broadcast domain entity 150 then supplies the desired information relating to locally available resources. In other embodiments the application-request packet is forwarded to the network server 125 via the second network connection 113. Downstream application data is then passed to the mobile unit 105 from the network server 125 via the second network connection 113. While the above discussion focused on a web browser application, other types of user interfaces and applications may be equivalently employed. For example, the display of the user input-output device 210 may be made of a simple LED array or a text-only LCD display. Other display options include projection displays and heads-up displays. The displays themselves can be reconfigurable and in some instances, such as is the case of touch-screen displays, would form the whole or a part of the human-machine interface. In this case the application program is operative to simply display a text message instead of a web-page image.

Another example of an electronic sign is an electronic real estate sign. When the vehicle 102 drives up in front of a property with a "for sale" sign, a set of data such as multiple listing information is transmitted to the mobile unit 105. In some systems a full set of photographs may be displayed within the vehicle 102. In one such example, the electronic real estate sign transmits information packets containing price and other information. A simple radio frequency transmitter placed within a window of the house may be used as the local broadcast domain entity 150. In systems where the mobile unit 105 includes the network connection antenna 110, a low cost transmitter may be used to broadcast an HTTP address packet so the full set of graphical data relating to the property may be downloaded to the mobile unit via the network connection 112. Additional filtering could be employed based upon client interests (e.g. price range, size of property desired, etc.) compared to data transmitted from the web page or from the broadcast domain entity 150.

Figure 3:
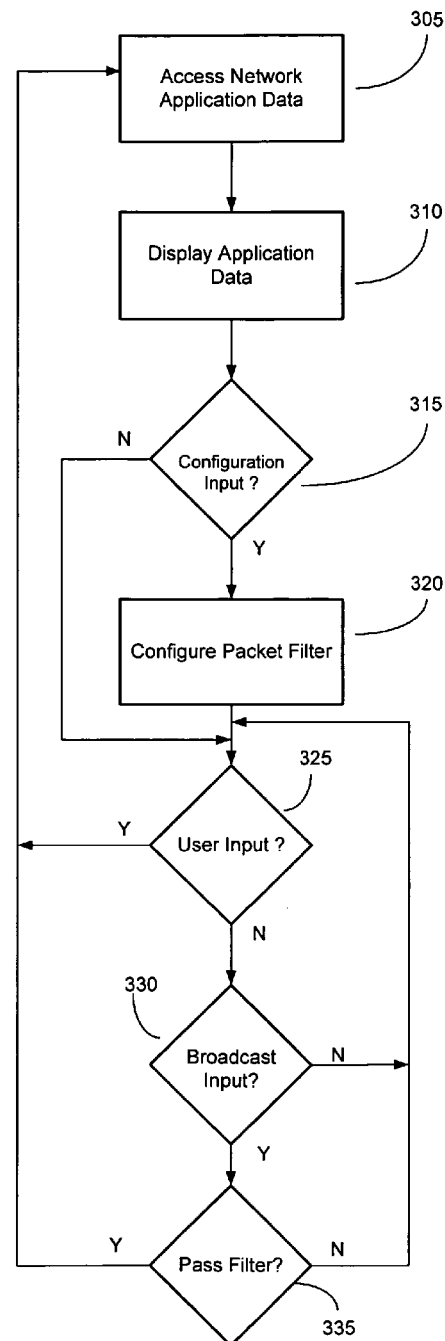
FIG. 3 is a flow chart illustrating a method of processing carried out in a mobile unit to provide a geographically controlled client-side application program.

Referring now to FIG. 3, a method 300 of processing 105 is illustrated in flow chart form. The method 300 is carried out by an application program such as a geographical web browser running on the mobile unit 105. The method 300 is designed to control the mobile unit 105 as configured according to FIG. 2. The method 300 represents a client-side method used to communicate and interact with a server-side method as discussed in connection with FIG. 4. When the mobile unit 105 is implemented in alternate embodiments, the method 300 is modified as well. These modifications are discussed after the following discussion relating to the mobile unit 105 as configured according to FIG. 2.

In a first step 305, a set of network application data is accessed. Application data may include, for example, web pages or database information. Application data is transmitted as application data packets using an application layer protocol such as HTTP. The application data is preferably downloaded from the network server 125 into the mobile unit 105 and then displayed on the user input-output device 210. Typically, the network application data involves web pages provided in hypertext mark-up language (HTML) but other forms of network application data may be equivalently used. In many cases, the network application data includes a packet-filter parameter. In some embodiments, to limit airtime, the first step 305 accesses the set of network application data from a memory or other form of storage unit accessible to the mobile unit 105. Control next passes to a second step 310 whereby information related to the network application data is displayed. In a preferred embodiment, the second step 310 involves displaying a web page on a web browser display screen that is a part of the user input-output device 210. Operational data such as the packet-filter parameter need not be displayed in the step.

Control next passes from the second step 310 based on a first decision 315. In the first decision 315, a check is made to see whether a new packet-filter configuration parameter has been received. The packet-filter parameter either enters the system as a part of the network application data, is input via the user input-output device 210, or is loaded from a memory within the mobile unit 105. If the packet-filter needs to be reconfigured, control next passes to a third step 320. In the third step 320 the packet-filter parameter is loaded into the packet filter 225. If the network application data was accessed from the network connection, the packet filter parameter is coupled into the packet filter 225 via the coupling from the network interface device 205. If the network application data was accessed from the user input-output device 210, the packet filter parameter is coupled into the packet filter 225 via the coupling from the user input-output device 210. As mentioned above, in some cases the parameter may be stored in a memory and loaded into the packet filter 225 via a coupling from the memory (not shown).

If the first decision 315 evaluates negatively, or after the packet filter has been configured in the third step 320, control next passes to set of decisions that implement a wait-for-input control flow. In the embodiment shown, control passes to a second decision 325 where a check is made to see whether a user input has been detected. If a user input has been detected, control passes back to the first step 305 where the user information is processed and possibly packetize for transmission via the first network connection 112. In the first step 305, new information may be accessed and the aforementioned steps are repeated. If the second decision 325 is negative, control passes to a third decision 330. In the third decision 330, a check is made to determine if a broadcast packet has been received. If the third decision 330 evaluates to the affirmative, control next passes to a fourth decision 335 whereby the received packet's header or other associated information is checked against the packet filter's bit mask, one or more keywords, or other form of interest designator as configured in the third step 320. If the fourth decision 335 evaluates to the affirmative, control passes back to the first step 305. In the first step 305 information derived from the packet filter output is preferably uploaded via the first network connection 112 and used to access a new set of network application data such as web pages. If the third decision 330 evaluates to the negative, control loops back to continue to check for a valid user input or packet filter output. If the fourth decision 335 evaluates to the negative, control also loops back to continue to check for a valid user input or packet filter output.

In the method 300, the decisions 325, 330 and 335 are shown to be implemented as a sequence of binary tests. A variety of equivalent control flows may be employed to implement these decisions. For example, these three decisions may be implemented such that a processor enters a wait loop and waits for an interrupt from a user I/O device or from the packet filter.

The method 300 implements a geographically controlled web browser when implemented by the remote unit 105 which moves about as illustrated in FIG. 1. For example, the first step 305 is operative to transmit one or more hypertext transfer protocol (HTTP) request packets via the first network connection 112. The first step 305 is also operative to download web page data so that it can be displayed in the second step 310 on the display of the user input-output module 210. If the first network connection 112 is coupled to the network server 125, and the network server is configured to process inputs from a geographical web browser, the server will typically download a packet-filter parameter to the geographical web browser. This packet-filter parameter tells the geographical web browser which packets to send via the first network connection 112 to the network server 125. If a packet-filter parameter is sent by the network server 125 or otherwise made locally available, the third step 320 is operative to configure the packet filter. Now as the mobile unit 105 moves from one broadcast domain to the next, only selected packets will pass through the packet filter and thereby navigate through a set of web pages to be displayed on the display screen of the mobile unit 105. Alternatively, the user may provide navigation commands and navigate the web browser using conventional methods such as keyboard entries, voice commands, or mouse clicks.

A geographical web browser has an added advantage of providing a new means for advertising locally available items such as products and services. The user interested in a certain product or service logs into a geographically controlled web site and configures the packet filter to display information related to a user's needs. In one example the mobile unit 105 enters a new city and the user is interested in finding a mall with a particular clothing store within. As the user drives along, a web page comes up and provides directions to the shopping mall and also optionally provides an inside map of the mall to include directions to the desired store. This form of advertising helps both the consumer and the storeowners. Similarly, if the mobile unit 105 is connected to a road-navigation site, new map pages may be periodically downloaded based upon the mobile unit 105's current position. If a user is using a hand-held unit, a similar type of scenario applies within the shopping mall, for example. A geographical web browser practicing the method 300 may also be used in systems where the local broadcast domain 150 is supplied by the same telecommunications cell site as used for the network connection 112.

The method 300 operates with some modifications in systems when the mobile unit 105 uses the satellite antenna 140 and employs the GPS receiver in the broadcast reception module 220. In such systems, the packet filter 225 does not filter packets but rather generates packets from a table based on a filter parameter and the calculated GPS positioning coordinates. The network server 125 or a memory preferably provides a set of potential pointers to web pages based on the user's current interest as defined by the web page to which the mobile unit 105 is connected. When the mobile unit crosses a boundary and enters a region within a locality, if any web page pointers are loaded for that locality and meet the packet-filter criterion, this has the same effect as if the decisions 330 and 335 were both affirmative. The comparison may be performed by subtracting from a set of reference coordinates a set of coordinates representative of the geographical location of the mobile unit and testing to see whether the difference is below a threshold. In some case the comparison may be made referenced to a man-made boundary such as a city limit or a cell coverage boundary. A "geographical packet" may be thereby generated to send a request for web pages or related application data to be downloaded. A "geographical packet" is a type of request packet sent by a geographical web browser to request application data such as web pages to be downloaded based on geographically related events. Instead of navigating an application by mouse-clicking on an icon or a hyperlink, a mobile unit automatically responds to positional and/or locally broadcast information packets. In some cases web pages may be stored locally and accessed locally using caching techniques to minimize the network transactions.

The method also operates with some modifications in situations where the mobile unit 105 does not include a network antenna 110 and thereby does not maintain the first network connection 112. In this case the difference is the packet stream received at the antenna 145 includes the web pages themselves. The packet filter operates similarly and only accepts web pages that match the packet-filter criterion.

Referring now to FIG. 4, a method 400 practiced by the network server 125 is illustrated in flow chart form. The method 400 is a server-side method that interacts with a client-side method such as the method 300. Recall the network server 125 may also be implemented as the application program 130. The method 400 is designed to provide the server side of a client-server application layer communication protocol. In this system the method 300 represents the client side of the connection and is practiced by the mobile unit 105. The method 300 communicates client-side data packets to the network server 125 that responds with server-side data packets as it practices the method 400.

In a first step 405, initial communications are performed with a client such as the mobile unit 105 practicing the method 300. For example, in a web browser application, the first step 405 involves receiving one or more HTTP request-packets and responding with packets comprising web-page data. Next control passes based on a decision 410 that checks to see whether one or more packet-filter parameters need to be downloaded to the client. If the decision 410 evaluates affirmatively, control passes to a second step 415 whereby the one or more packet-filter parameters are transmitted to the client. After the second step 415, control next passes to a third step 420. If the decision 410 evaluates negatively, control bypasses the second step 415 and passes directly to the third step 420. In the third step 420, a standardly generated or a geographically generated data application packet is received at the network server 125. For example, a standardly generated application packet may be an HTTP packet transmitted by the method 300 after the user has clicked on an Internet link. As used herein, this type of packet is also called a "standard-request packet." A geographically generated HTTP request packet references a page to which there is not necessarily a link. Instead of selecting a link, the HTTP request is generated in the first step 305 of the method 300 after the decision 335 indicates a packet has passed through the packet filter and thereby web pages need to be downloaded. A packet generated as such is one type of "geographical packet." Another type of "geographical packet" is a request packet generated when a GPS receiver identifies the mobile unit 105 has passes into a locality and a request needs to be sent to the network server 125 as previously discussed.

Control next passes to a fourth step 425 whereby one or more application packets are transmitted in response to the request received in the third step 420. Typically, the application packets transmitted in the fourth step 425 include information relating to one or more new web pages being downloaded from the network server 125 to the mobile unit 105 via the first network connection 112. In some systems it is desirable to download a plurality of web pages into a cache within the mobile unit 105. The user then preferably uses the "next" button in the geographical web browser to access the plurality of downloaded pages.

Control next passes out of the fourth step 425 based upon a second decision 430. The second decision 430 checks to see whether the user has selected a link directing control away from the network server 125. If the second decision 430 evaluates affirmatively, control passes to a fifth step 435 whereby the method is exited. If the second decision 430 evaluates negatively, control passes back to the third step 420 to await more standardly or geographically generated application packets.

Referring now to FIG. 5a, a method 500 of processing within a communication system is illustrated. In a first step

505, the local broadcast domain entity 150 is operative to transmit a low power broadcast packet that is then received by the mobile unit 105. The mobile unit 105 selectively passes the received packet according to the packet-filter parameter as configured in the third step 320 of the method 300. Control next passes to a second step 507. In the second step 507, a set of application data such as web pages are supplied by the network server 125 via the first network connection 112 to the mobile unit 105. Depending on the system configuration, this step may also be performed by the local broadcast domain entity 150 so that the web pages or other application data is received via the local broadcast antenna 145. In such systems, the web pages may be stored within the local broadcast domain entity 150 itself, or may pass through the local broadcast domain entity 150 after having been downloaded from the network server 125 via the second network connection 113. Control next passes to a third step 509 practiced by the remote unit 105 whereby a set of application data such as web pages is displayed on the user input-output device 210.

Referring now to FIG. 5*b*, a method 510 of processing practiced by the mobile unit 105, the local broadcast domain entity 150 and optionally the network server 125 is illustrated in flow chart form. In the method 510, the mobile unit 105 and the local broadcast domain entity 150 engage in cooperative two-way communications. In a first step 515, the mobile unit 105 transmits a user-interest packet via the local broadcast domain antenna 145 to the local broadcast domain entity 150. In this method, the local broadcast domain entity 150 includes both a transmitter and a receiver, i.e., a transceiver. Also, the second link controller 215 also includes a transceiver capable of both transmitting and receiving within the local broadcast domain. As discussed hereinafter, the user-interest packet may be encrypted using a scheme such as public key encryption. If an encrypted user-interest packet is used, the system may employ challenge-and-reply authentication to thereby restrict access to information Control next passes to a second step 520. While the first step 515 is practiced by the mobile unit 105, the second step 520 is practiced by the local broadcast domain entity 150. In the second step 520, the user-interest packet transmitted by the mobile unit 105 in the first step 515 is received by the local broadcast domain entity 150. Control next passes to a third step 525 practiced by the local broadcast domain entity 150 in response to the first step 515. In the third step 525, the user-information packet received in the second step 520 is processed. This step involves extracting the user-information packet from a signal transmitted from the antenna 145 and received by the local broadcast domain entity 150. Once received, the third step 525 involves feeding the user-information packet to a software module for evaluation. The software module checks the received user-interest packet to determine whether or not the local broadcast domain entity 150 can supply information related to a service desired by the user. The software module checks the user-interest packet and makes a decision 530. If the local broadcast domain entity 150 cannot supply information related to a service desired by the mobile unit 105 as indicated by the user-interest packet, control transfers back to the first step 515. In this case the local broadcast domain entity performs no action and awaits another user-interest packet to be transmitted. In some systems, the local broadcast domain entity 150 may also practice the method 500 while waiting for the next user-interest packet.

The user-interest packet is a packet identifying a specific user interest. For example, the user within the vehicle 102 has a toothache and enters the domain of the local broadcast domain entity 150. The user is thereby interested in finding a dentist. The user enters information via the user input-output device 210 either by mouse click, keyboard entry, or voice commands indicative of this interest. The mobile unit 105 then broadcasts this information via the antenna 145 into the broadcast domain to be received by the local broadcast domain entity 150. If a local dentist is registered with the local broadcast domain entity 150, the decision 530 evaluates affirmatively and a packet relating a locally available dentist will be transmitted back to the mobile unit 150 as discussed below.

In another example the mobile unit 105 is implemented as a palm-pilot or personal digital assistant computer. A user carrying the palm-pilot version of the mobile unit 105 enters a shopping mall and is looking for a silver plated picture frame under fifty dollars. Information to this effect is entered by the user as discussed above and a user-interest packet is transmitted according to the first step 515. The local broadcast domain entity 150 is preferably controlled by the shopping mall authorities or a contracted advertising company. The steps 520 and 525 then are performed to determine which stores carry the item of interest. If any of the stores within the shopping mall carry the item of interest, the decision 530 evaluates affirmatively and a packet will be transmitted back to the mobile unit 150 as discussed below.

If the decision 530 evaluates affirmatively, control next passes to a fourth step 535. In the fourth step 535 a reply packet is transmitted back to the mobile unit 105 in response to the user-interest packet transmitted in the first step 510. In systems employing challenge and password authentication procedures, an exchange of packets may be required between the mobile unit 105 and the local broadcast domain entity 150 before the fourth step 535 is performed. Control next passes to a fifth step 540 whereby application data such as web pages relating to the topic of the user-interest packet is supplied to the mobile unit 105. Depending on the system configuration, the fifth step 540 may be performed by the local broadcast domain entity 150 so that the application data is received via the local broadcast antenna 145. In other systems, the fifth step 540 is performed by the network server 125 which downloads the application data to the mobile unit 105 via the first network connection 112. Control next passes to a sixth step 545 practiced by the remote unit 105 whereby information related to the application data such as web pages is displayed on the user input-output device 210.

In restricted access systems, transmissions of the method 510 may be encrypted and electronic challenge and reply authentication may be used. Challenge and reply authentication involves providing a digital signature so that electronic eavesdroppers cannot gain access to a password. Public key encryption methods are preferably used to allow information to be disseminated using the method 510 to authorized mobile units only.

In systems involving multiple users the local broadcast domain entity must receive packets possibly from multiple different mobile units 105. One way to handle this type of situation is to use a method known as carrier sense multiple access. The mobile units transmit burst data packets infrequently and at random intervals so the channel is clear most of the time. If two mobile units attempt to transmit simultaneously, a data collision occurs and an error detection algorithm involving check-bits is employed to determine the validity of a received data packet. If the received data packet includes errors, it is dropped. The two mobile units attempt to retransmit their packets at random time delays and in all probability are able to get then through on their second try. Other multiple access techniques may also be used but are not considered further herein because they are already well known in the art. These multiple access techniques include frequency division multiple access, time division multiple access and code division multiple access.

Figure 6:
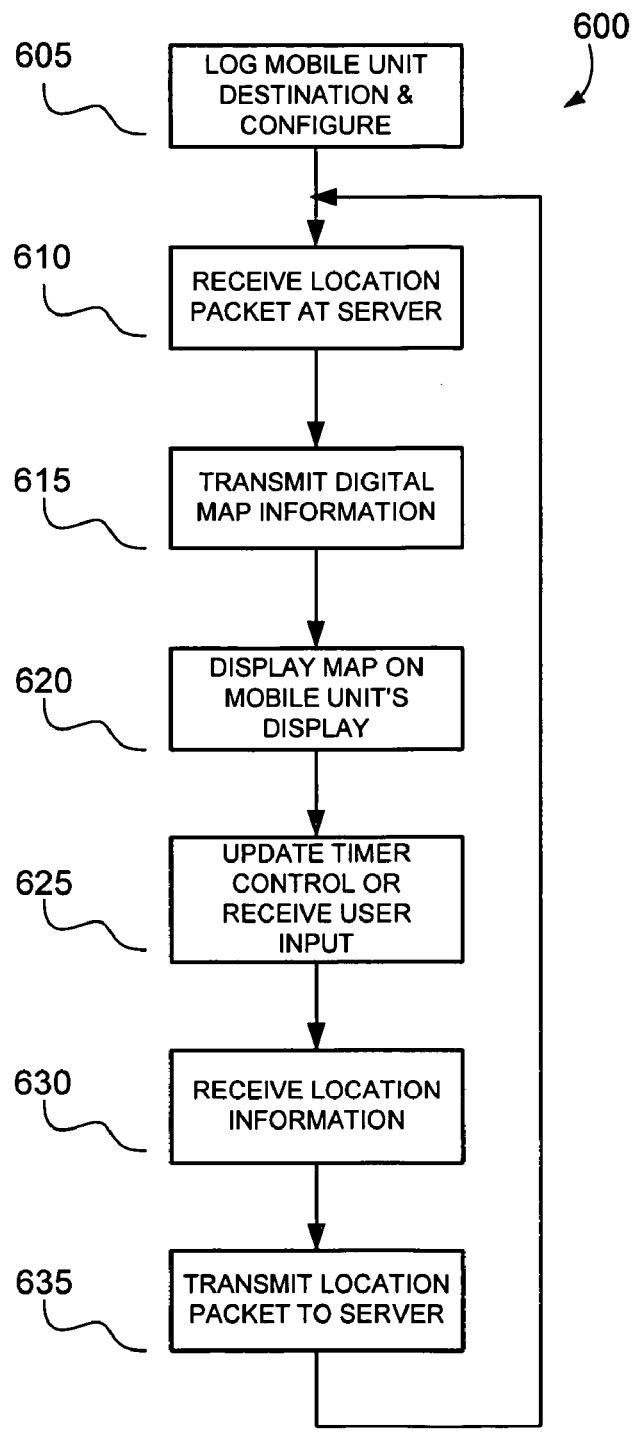
FIG. 6 is a flow chart illustrating a method of processing carried out between a mobile unit and a network server to provide road navigation and traffic management information to the mobile unit.

Referring now to FIG. 6, a method 600 to assist in road navigation is illustrated in flow chart form. The method 600 may also be practiced in off-road situations such as shopping malls when the mobile unit 105 is implemented, for example, as a palm-pilot. In a first step 605, the mobile unit 105 transmits a set of information related to the mobile unit's desired destination to a server such as the network server 125. This information may be transmitted via the first network connection 112 or may be passed through the local broadcast domain entity 150 and to the network server 125 using the second network connection 113.

Control next passes to a second step 610 whereby the information transmitted in the first step 605 is received at a navigation server. The navigation server may be implemented, for example as the application program 130, or the network server 125. Within building environments such as a shopping mall, a picocell architecture may be employed so that the Internet 122 is actually implemented as an intranet. For the purposes of description, an embodiment whereby the navigation server is implemented within the network server 125 will be described. Control next passes to a third step 615. In the third step 615 a set of navigation information such as directions or a digital map is transmitted from the navigation server back to the mobile unit 105. Control next passes to a fourth step 620 where the information transmitted to the mobile unit 105 in the third step 615 is displayed on the user input-output device 210. This step often involves displaying an image with a digital map marking the best current route to the desired destination as defined in the first step 605.

Control next passes to a fifth step 625. The fifth step 625 may be executed after a timer has timed out, a local broadcast packet has passed through the packet filter 225, or a user input has been entered via the user input-output device 210. Once fifth step 625 indicates new navigational information is needed, control passes to a sixth step 630. In the sixth step 630 new location information is received at the mobile unit 105. This location information may be obtained using a GPS receiver, or by packet filtering local broadcast domain packets. In the navigation application, the packet filter is set to pass navigation packets that indicate the mobile unit 105's geographical location.

Control next passes to a seventh step 635 where the mobile unit 105's location information is uploaded to the navigation server. This step may be performed in a variety of ways. For example, the mobile unit 105 may activate a virtual session and send the location information via the first network connection 112. Alternatively, the mobile unit 105 may transmit a request packet to the local broadcast entity 150 which then transmits the packet via the second network connection 113. After the seventh step 635, control passes back to the second step 610 where the navigation server once again receives a current-location packet from the mobile unit 105 and the foregoing steps are then repeated.

It should be noted the navigation server preferably selects a best route when transmitting route information to the mobile unit 105 in the third step 615. The best route information is preferably calculated based on traffic conditions and distance. For example, a set of one or more sensors is associated with local broadcast domain entity 150. The sensors measure traffic conditions using, for example, laser continuity sensors to measure vehicle speeds. The sensor information is forwarded back to the local broadcast domain entity 150 via wireless, wireline, or optical links. The sensor information is uploaded via the second network connection 113 to the network server 125 which acts as the navigation server for the system. The navigation server preferably collects data from a plurality of local broadcast domains in order to keep up-to-date information about road conditions and routes over a wide geographical coverage. The navigation server thereby calculates the best route of travel for the mobile unit 105 for its destination and includes this information transmitted in the third step 615.

Figure 7:
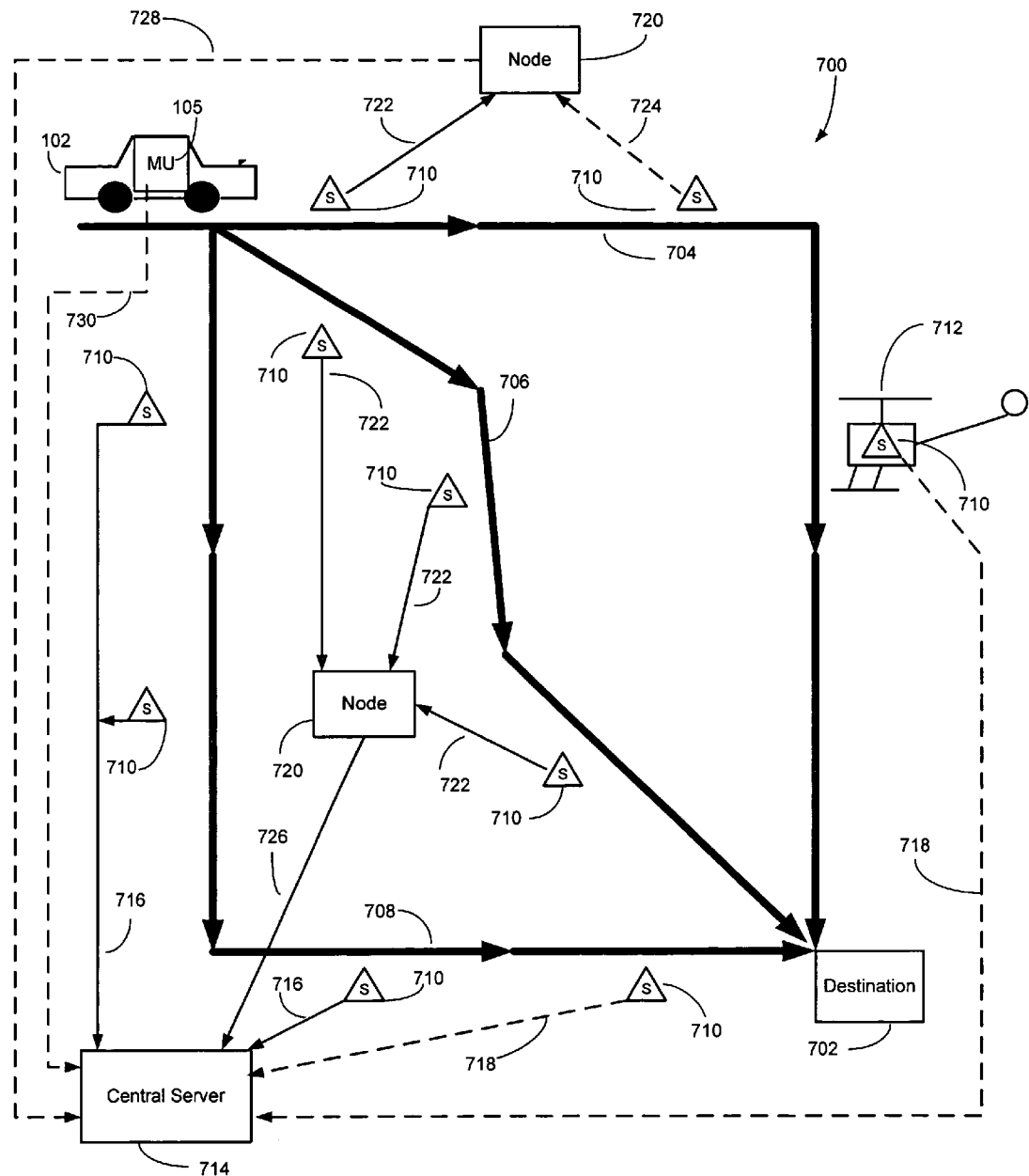
FIG. 7 is a block diagram representing an embodiment of the invention applied to traffic management applications.

Referring now to FIG. 7, a block diagram of system for navigation and traffic management 700 is illustrated. A vehicle 102 includes a mobile unit 105, and is connected to a desired destination, 702 through a plurality of roadways, or routes 704, 706 and 708. Dispersed along the roadways, is a plurality of geographically dispersed sensors, 710. In some instances, these geographically dispersed sensors may be deployed in a mobile unit such as the helicopter, 712, shown in FIG. 7. These sensors are connected to a central server 714 through wireline links 716 and wireless links 718. In some cases, the sensors are combined in intermediate nodes, 720. The intermediate nodes 720 are connected to the sensors through wireline links 722 and wireless links 724. The intermediate nodes 720 are connected to the central server 714 through wireline links 726 and wireless links 728. A fiber optic link 726 is a special form of a wireline link and is illustrated in FIG. 7. The central server 714 is coupled to the mobile unit through wireless link 730.

In FIG. 7, the vehicle 102 is proceeding towards a destination, 702. In the case of a commuter, the vehicle may be heading to work, in an office or a factory, or home. The vehicle could also be in transit between cities or boroughs. In many instances, the operator of the vehicle has a choice among routes, 704, 706, or 708. For example and without limitation, route 704 may be a busy secondary road, route 706 may be a highway or freeway with controlled access, and route 708 may be a back road. As is well known to most drivers, it may be the case where the highway, 706, may be the fastest unless there is congestion or an accident has occurred. The operator of the vehicle may desire to know the navigational route which will allow him to arrive in the shortest time, or encounter a minimum of traffic. The controlling authority of the roadways may similarly desire to regulate traffic, encouraging travel along alternate routes and at alternate times. The controlling authority of the roadways is thus motivated to share traffic patterns with the operator of the vehicle whose interests are generally aligned. Further inducement may be offered through a systems of road usage fees or tolls where off peak travel or secondary route travel is monetarily less expensive than peak or rush hour traffic, and travel along congested roads. It will be recognized that traffic congestion fluctuations are often unpredictable due to accidents and special events. The routes considered in this invention may not necessarily include all routes, and it is envisioned that early application of this system will limit itself to major highways and interstate freeways most prone to rush hour congestion. Heavily trafficked secondary roads will be added to the system next.

The invention disclosed herein teaches the use of sensors, 710, which are used to measure the road conditions, including the amount and speed or traffic flow. By example and without limitation, 710 sensors may use infrared beam technology, pressure cables strung across the roadway, human observers, or electronic cameras such as CCD arrays. Further, any combination of technologies may be used. The sensors 710 may be statically mounted at an observation point, such as an intersection, or an entrance ramp, or the sensors 710 may be mounted in a mobile unit such as a traffic helicopter or a police car or other vehicle.

The data measured and collected by the sensors 710 are communicated in raw or processed fashion to the central server 714. The communication links may generally be either wireless or wireline. Examples of wireline links include, without limitation, twisted pair wire, coaxial cable, plastic and glass fiber optics, and other transmission line media. Wireless links include, without limitation, RF, microwave and IR transmission between transmitting antennas and receiving antennas, or transmitting sources and receiving sources. The data collected by sensors 710 may be directly transmitted to the central server 714, or the data may be relayed to the intermediate nodes 720 for simple multiplexing, packetizing, preprocessing and/or filtering before retransmission to the central server 714.

At the central server 714, the data is collected and analyzed. In a simple embodiment, information about traffic density and flow along different roadways may be organized and broadcast to the mobile unit 105, to serve an announcement function similar to the existing traffic reports heard on metropolitan radio shows during rush hours. Alternatively, the analysis may entail calculating a preferred route for a vehicle 102 optimizing for distance weighted by road conditions. In yet a third embodiment, the data collected on traffic flow and road conditions may be used to set adaptive road tolls in order to use market forces to regulate the operator's choice of route. The concept of adaptive road tolls are tolls, tariffs or fees on a segment of a road or highway that change or adapt to demand. As road space becomes more in demand, the tolls preferably adjust to regulate the use of a given segment of road. The adaptive road tolls enable the use of an efficient free market mechanism to allocate the increasingly scarce resource of road space. The adaptive road tolls represent a usage fee and provide an improvement to fixed vehicle tariffs paid, for example, by county per year. The invention may be used to record and assess the adaptive road tolls through link 730 and central server 714. Alternatively, payment may be made through existing technology such as the TollTag™ marketed by AmTech Corp.

The information collected and calculated by the central server, and in some cases, the intermediate nodes is relayed to the mobile unit 105 through a wireless link 730. The wireless link 730 may be direct or through a plurality of local broadcast domain entities as disclosed above.

The discussion of FIG. 7 may be used to develop an alternative embodiment of the method 600. This alternative embodiment provides a method for traffic management. Traffic management is a process whereby a controlling authority provides an incentive system to alter and control traffic flows. The alternate version of the method 600 operates as follows. The first 605 is the same as previously discussed. The second step 610 is augmented with the process of receiving information indicative of traffic conditions related to a plurality of roads and adaptively assigning a road usage toll to at least one of these roads based upon the received information. The step 615 is augmented by also electronically providing information relating to the adaptive road usage tolls to the mobile unit. The step 620 is augmented by also showing cost information relating to one or more routes. The digital map may show several routes, estimated travel times on each route, and a monetary cost for traveling on each route. In some systems, with or without adaptive tolls, the step 620 may also display information indicative of the estimated travel time associated with each route. By displaying estimated travel times and adaptive tolls, drivers can make an educated decision as to which route to select.

The steps 625 and 630 are optional in this alternative method and the step 635 may be practiced using a reflective means such as the TollTag™ marketed by AmTech Corp. That is, the step 635 may involve the controlling authority probing to determine the mobile unit's location instead of the mobile unit transmitting this information. Alternatively, the step 635 may involve the mobile unit automatically sending information related to its geographical position to continue to accept updated route information and to be charged accordingly. As such, the step 610 is also modified to identify electronically (to include optically, with or without probing) the mobile unit's choice of roadways and automatically charge the mobile unit's associated vehicle based upon the adaptive road usage toll. Instead of charging the vehicle for taking the best route, a credit can alternatively be applied against a taxation if the vehicle selects a less desirable route and thereby lessens a traffic loading on a congested roadway.

Although the present invention has been described with reference to specific embodiments, other embodiments may occur to those skilled in the art without deviating from the intended scope. It should be noted while the foregoing examples make use of a web browser application whereby application data involves HTTP packets representative of web pages, this is not required. Rather the present invention encompasses any application layer program that may send application layer packets to support other types of applications. Also, while the preferred embodiments employ various antennas such as the antennas 110, 140, and 145, other types of transducers including ultrasonic and laser sensors may equivalently be used in some systems. Also, while the present disclosure focused on a mobile unit, geographically based web browsing may be used by stationary systems as well. For example a central movies site may automatically provide links to movies in a local area based on the access number used to connect to the network. Various modules have been described as being implemented in software but could equivalently be implemented in dedicated hardware. Also, while an embodiment where separate telecommunication cell and local broadcast domain entities exist, these may be merged. Likewise, packet filters may be set up to filter packets based on a bit mask to be compared to a packet header, or packet filters may compare keywords or other information to information contained within the data field of the packet itself. In any of the traffic management techniques, adaptive toll charges may be replaced with an adaptive credit system. Therefore, it is to be understood that the invention herein encompasses all such embodiments that do not depart from the spirit and scope of the invention as defined in the appended claims.

What is claimed is:

1. A geographical information system comprising:
a public access wireless local area network station with a low-power local coverage area substantially smaller than a coverage area of a base station node of a cellular network, the public access wireless local area network station operative to wirelessly communicate with one or more user mobile devices, and to provide connectivity to a remote network server via an Internet, the public access wireless local area network station further operative to wirelessly transmit at least one unsolicited data packet into its low-power local coverage area, wherein the unsolicited data packet contains an identifier; and a wireless user device configured to receive the unsolicited data packet, to compare the identifier to one or more stored user-configured preference parameters and to selectively generate a user-selectable notification for display to a user associated with the wireless user device when the comparison generates a positive result; wherein the user has the ability to select the user-selectable notification, and in response to the selection, a request packet is wirelessly sent from the wireless user device to the public access wireless local area network station and forwarded via the Internet to the remote network server, and in response, a set of content related to the notification is downloaded to the wireless user device from the remote network server.

2. The geographical information system of claim 1, further comprising:

the cellular network, the cellular network comprising the cellular base station, the cellular base station being coupled to provide to the wireless user device a first connection to the Internet.

3. The geographical information system of claim 2 wherein the public access wireless local area network station provides a second connection to the Internet, and depending on the geographical position of the wireless user device, the wireless user device can select between using the first and second connections while maintaining communications with the remote network server.

4. The geographical information system of claim 3, wherein the wireless user device can switch between the first and second connections while also maintaining communications with one or more additional remote network servers that are coupled to the Internet.

5. The geographical information system of claim 1 wherein the unsolicited data packet contains a URL indicative of an application layer address of the remote network server, and the URL is used to direct the request packet to the remote network server.

6. The geographical information system of claim 1 wherein the unsolicited data packet contains a network address of the remote network server, and the network address is used to direct the request packet to the remote network server.

7. Mobile communications apparatus comprising:

a cellular radio transceiver configured for communications with a cellular base station via a cellular communications air interface protocol that supports wireless packet data connectivity, the cellular base station being configured to provide a communication path to a remote network server via an Internet;

a wireless local area network packet transceiver configured for communications with a public access wireless local area network station via a low-power wireless local area network protocol, wherein the wireless local area network packet transceiver has a transmission radius substantially less than the transmission radius of the cellular radio transceiver and is adapted for wireless local area network communications;

a network interface module coupled to the wireless local area network packet transceiver, the network interface module operative to receive one or more unsolicited packets from the public access wireless local area network station, the network interface module further comprising a packet filter and one or more user-configured filter parameters, wherein the packet filter is operative to compare at least the one or more user-configured filter parameters to indication of a type of content associated with the one or more unsolicited packets, and the mobile communications apparatus is configured to generate a notification for display on a user interface when the comparison generates a positive result.

8. The mobile communications apparatus of claim 7, wherein the public access wireless local area network station is configured to provide a connection to an Internet, and the notification is selectable by a user associated with the mobile communications apparatus, the mobile communications apparatus further comprising:

a content download software operative to send a request packet to be routed to the network server via the public access wireless local area network station and via the Internet responsive to selection of the notification by the user, and to receive downloadable content from the remote server via the Internet, the downloadable content being related to the notification.

9. The mobile communications apparatus of claim 8, wherein the one or more unsolicited packets contain an address of the remote network server, and this address is used to direct the request packet to the remote network server.

10. The mobile communications apparatus of claim 9, wherein the address comprises a URL indicative of an application layer address of the remote network server.

11. The mobile communications apparatus of claim 7, wherein the notification is selectable by a user associated with the mobile communications apparatus, the mobile communications apparatus further comprising:

a content download software operative to send a request packet to be routed to the network server via the cellular base station and via the Internet responsive to a selection of the notification by the user, and to receive downloadable content that is stored on the remote server, the downloadable content being related to the notification.

12. The mobile communications apparatus of claim 7, wherein the cellular base station provides a first connection to an Internet, the public access wireless local area network station provides a second connection to the Internet, and the wireless user device can select between using the first and second connections while maintaining communications with the remote network server.

13. The mobile communications apparatus of claim 7, wherein the notification comprises a user selectable image, which upon selection by a user associated with the mobile communications apparatus, provides to the user content related to the notification.

14. A mobile communications apparatus, comprising:

a first receiver configured to wirelessly communicate with a wireless local area network station via a low power wireless communication protocol and to receive an unsolicited packet from the wireless local area network station, the unsolicited packet containing an indication of information content;

an information content selective packet filter configured to receive at least the indication and to compare one or more stored information-content parameters to at least the indication and to selectively produce an output when the comparison provides a positive result; and a display device configured to receive information related to the output and operative to display an image related to the received information.

15. The mobile communications apparatus of claim 14, wherein the image is selectable by a user associated with the mobile communications apparatus, the mobile communications apparatus further comprising a software component operative to, in response to selection of the image by the user, cause a request packet to be coupled via the wireless local area network station to a remote network server that has additional content related to the indication.

16. The mobile communications apparatus of claim 15, wherein the unsolicited data packet contains an address of the remote network server, and this address is used to direct the request packet to the remote network server.

17. The mobile communications apparatus of claim 16, wherein the address comprises a URL indicative of an application layer address of the remote network server.

18. The mobile communications apparatus of claim 15, wherein the remote network server is coupled to the wireless local area network via an Internet.

19. The mobile communications apparatus of claim 18, wherein the software component is further operative to receive from the remote network server, via the Internet and the wireless local area network station, a set of downloadable content related to the indication.

20. The mobile communications apparatus claim 14, further comprising a second receiver wirelessly coupled to a cellular network.

21. The mobile communications apparatus of claim 20, wherein the image is selectable by a user associated with the mobile communications apparatus, the mobile communications apparatus further comprising a software component that, in response to selection of the image by the user, causes a request packet to be coupled via the cellular network to a remote network server that has additional content related to the indication.

22. The mobile communications apparatus of claim 20, wherein the image is selectable by a user associated with the mobile communications apparatus, the mobile communications apparatus further comprising a software component that, in response to selection of the image by the user, using an address extracted from the unsolicited packet, causes a request packet to be coupled via the cellular network and an Internet to a remote network server that has downloadable content related to the indication, and to receive from the remote network server, via the Internet and the cellular network, the downloadable content related to the indication.

23. The mobile communications apparatus of claim 14, wherein the information content related to the unsolicited packet is streamed to the first receiver via the low-power wireless communication protocol and selectively passed through the packet filter without the need for a user associated with the mobile communications apparatus to request the information content to be downloaded.

* * * * *